US007343928B2

(12) United States Patent
Moesby

(10) Patent No.: US 7,343,928 B2
(45) Date of Patent: Mar. 18, 2008

(54) REGULATOR INSERT WITH HYDRAULIC DAMPING IN OUTLET

(75) Inventor: Peter Moesby, Slagelse (DK)

(73) Assignee: Flowcon International A/S, Slagelse (DK)

( * ) Notice: Subject to any disclaimer, the term of this patent is extended or adjusted under 35 U.S.C. 154(b) by 145 days.

(21) Appl. No.: 10/576,017

(22) PCT Filed: Oct. 18, 2004

(86) PCT No.: PCT/DK2004/000714

§ 371 (c)(1),
(2), (4) Date: Apr. 17, 2006

(87) PCT Pub. No.: WO2005/038316

PCT Pub. Date: Apr. 28, 2005

(65) Prior Publication Data

US 2007/0125432 A1    Jun. 7, 2007

(30) Foreign Application Priority Data

Oct. 16, 2003    (DK) .............................. 2003 01525

(51) Int. Cl.
*F16K 3/26*    (2006.01)
(52) U.S. Cl. .................. 137/505.22; 137/901; 251/117
(58) Field of Classification Search ............ 137/625.3, 137/505.22; 251/61.1, 117, 901
See application file for complete search history.

(56) References Cited

U.S. PATENT DOCUMENTS

| 2,059,808 | A | * | 11/1936 | Robart et al. ................. 417/46 |
| 2,573,680 | A | * | 11/1951 | Arnold ........................ 251/61 |
| 3,574,310 | A | * | 4/1971 | Souriau ................... 137/625.3 |
| 3,727,623 | A | * | 4/1973 | Robbins ........................ 137/1 |
| 5,178,324 | A |   | 1/1993 | Moesby |

FOREIGN PATENT DOCUMENTS

| WO | 90/01657 | 2/1990 |
| WO | 95/12082 | 5/1995 |
| WO | 03/036143 | 5/2003 |

* cited by examiner

*Primary Examiner*—John Fox
(74) *Attorney, Agent, or Firm*—Dykema Gossett PLLC

(57) ABSTRACT

A regulator insert for valves includes inflow openings and a plurality of slot-shaped outflow openings extending in the axial direction of the insert and being, via a roller membrane, closable in response to the difference in pressure across the insert under the influence of a spring that seeks to keep the outflow openings open. The slot-shaped outflow openings have at least two different lengths, whereby complete closure of at least some of the outflow openings can take place only consecutively. At least one of the slot shaped outflow openings has such length that complete closure thereof by means of the roller membrane is not possible.

3 Claims, 1 Drawing Sheet

REGULATOR INSERT WITH HYDRAULIC DAMPING IN OUTLET

BACKGROUND OF THE INVENTION

1. Field of the Invention

The invention relates to a regulator insert for valves, such as valves used for controlling liquid flow in a plant for central heating or air conditioning.

2. The Prior Art

Such regulator insert is known from eg WO 95/12082 showing a regulator insert that comprises a housing which is, at the one end, provided with radial inflow openings and, at the one end, provided with radial inflow openings and, at the other end, with radial and axially extending slot-shaped outflow openings. The insert is configured with a roller membrane that closes off the outflow openings to a smaller or larger degree in response to the difference in pressure across the insert, so as to accomplish an essentially constant liquid flow through the insert. The roller membrane is influenced by two oppositely oriented forces; viz, on the side where the outflow openings are located, by the pressure within the insert and a helical spring that seeks to keep the outflow openings open and, on the opposite side, by the pressure prevailing immediately outside the inflow openings of the insert, liquid communication being established there between. In case of a given difference in pressure across the insert, the roller membrane will adapt at a state of equilibrium between these forces which results in a constant liquid flow through the insert. In the shown regulator insert the overall area of the inflow openings can be set incrementally in advance—preferably to a desired constant liquid flow through the insert.

When a regulator insert of this type is mounted in eg a central heating plant, pressure conditions sometimes prevail in the plant that causes the roller membrane in the regulator insert to close off the outflow openings completely, following which it will, however, immediately reopen the outflow openings. Since all the slot-shaped outflow openings have the same axial length, the complete closure occurs very suddenly, which also contributes to quick reopening of the outflow openings. The roller membrane may hereby be caused to oscillate thereby causing undesired pressure conditions in the entire plant. Usually this is only a minor problem, if only one or a few regulator inserts of this type is/are used. Often, however, large numbers of regulator inserts are used that may, in adverse conditions, initiate each other to oscillate simultaneously and whereby so comprehensive oscillation problems may occur throughout the plant that it is destroyed.

It is the object of the invention to provide a regulator insert of the type mentioned above, wherein said problem cannot occur.

SUMMARY OF THE INVENTION

This is accomplished by configuring the regulator insert to have slot-shaped outflow openings which have at least two different lengths, whereby complete closure of at least some of the outflow openings can take place only consecutively, and at least one of the slot-shaned outflow openings has such length that complete closure thereof by means of a roller membrane is not possible.

Hereby it is accomplished that the roller membrane gradually closes off the slot-shaped outflow openings. Thus, no instantaneous closure takes place as was the case with the known regulator insert. It can also be expressed by the gradual closure of the outflow openings bringing about a hydraulic damping of the outlet of the insert. By moreover configuring the regulator insert such that complete closure of the outflow openings is not possible, it is accomplished that the insert never reaches this extreme position.

According to a preferred embodiment the insert is provided with a central pipe which is in connection with a space above the roller membrane, which central pipe is throttled by an element which exhibits only a very small opening. When such regulator insert is used in a heating plant, the central pipe is connected to the flowing liquid, and the closure of the outflow openings is thus determined by the pressure conditions prevailing at any time across and through the insert and the pressure measured from the outside via the central pipe. The size of the opening in the element throttling the central pipe defines the response time of the system: the smaller the opening, the slower the reaction.

The opening in the element throttling the central pipe is advantageously smaller than the smallest possible opening of the slot-shaped outflow openings. Hereby it is further ensured that the insert will not be able to initiate oscillations.

BRIEF DESCRIPTION OF THE DRAWINGS

The invention will now be explained in further detail with reference to the drawing, wherein FIG. 1 schematically shows a sectional view of a heating plant, wherein a regulator insert according to the invention can advantageously be employed.

DETAILED DESCRIPTION OF THE PREFERRED EMBODIMENT

Figure 1:
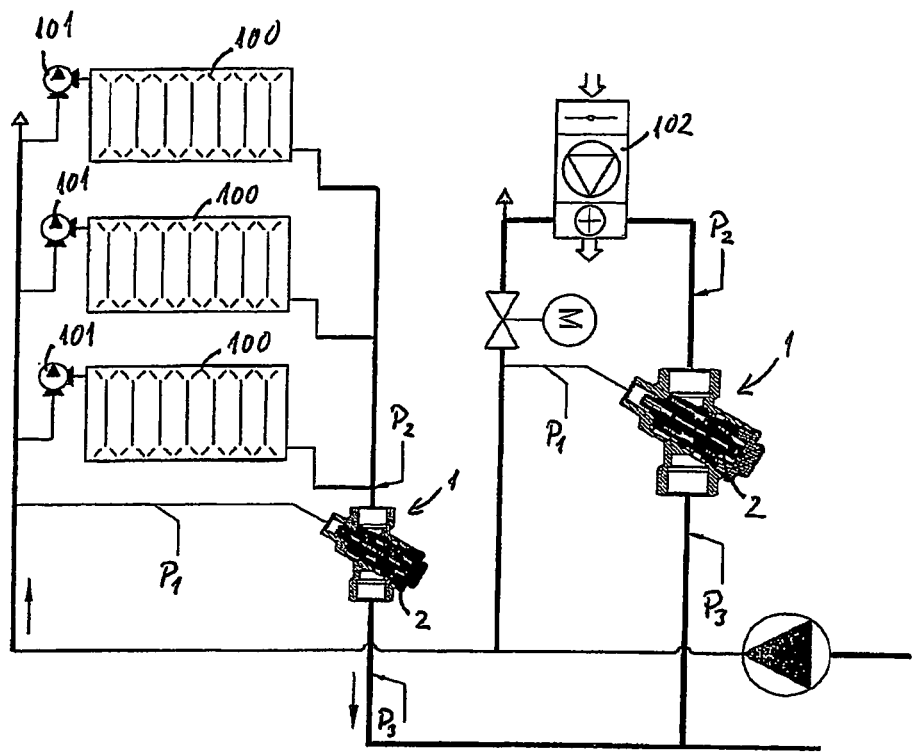

FIG. 1 schematically shows a sectional view of a heating plant, which uses regulator valves 1 with inserts 2 according to the invention for regulating a constant differential pressure ($P_1$-$P_2$) across the individual distribution strings. FIG. 1 is a sectional view showing two distribution strings, wherein the heat-carrying medium is distributed to three respective radiators 100 with thermostatic regulator valves 101 and to an air-heating terminal 102 regulating the injected air to a given temperature via a thermostatic regulator valve and heat exchange between the heat-carrying medium and a forced flow of air.

Each regulator valve 1 is arranged on the return string with a capillary-tube connection to the lead string. A given differential pressure across the distribution string between the connection point on the lead string and the inlet of the regulator valve 1 is maintained to a magnitude determined by the interaction between a spring 14 and a roller membrane 11 (see below with reference to FIG. 2) in the insert 2.

Apart from the advantage brought about by use of a regulator valve 1 with an insert 2 according to the invention to prevent the occurrence of undesired oscillations in the plant, the shown integration into the plant also presents other advantages. Radiator valves are known ia for emitting acoustic noise during passage of the heat-carrying medium. This noise becomes unacceptably high in case of high speed of medium, but regulation of the differential pressure ($P_1$-$P_2$) by means of a regulator valve according to the invention enables reduction of the speed of medium and the noise to an acceptable level.

Moreover it is known that, in case of a thermostatic regulator valve for regulating the temperature of the injected air in an air-heating system, varying differential pressures will entail undesired disturbances in the regulator system and hence lead to excessive deviations in the regulated temperature. Therefore, a regulation of the differential pressure ($P_1-P_2$) will entail a stable and accurate regulation of the temperature.

Figure 2:
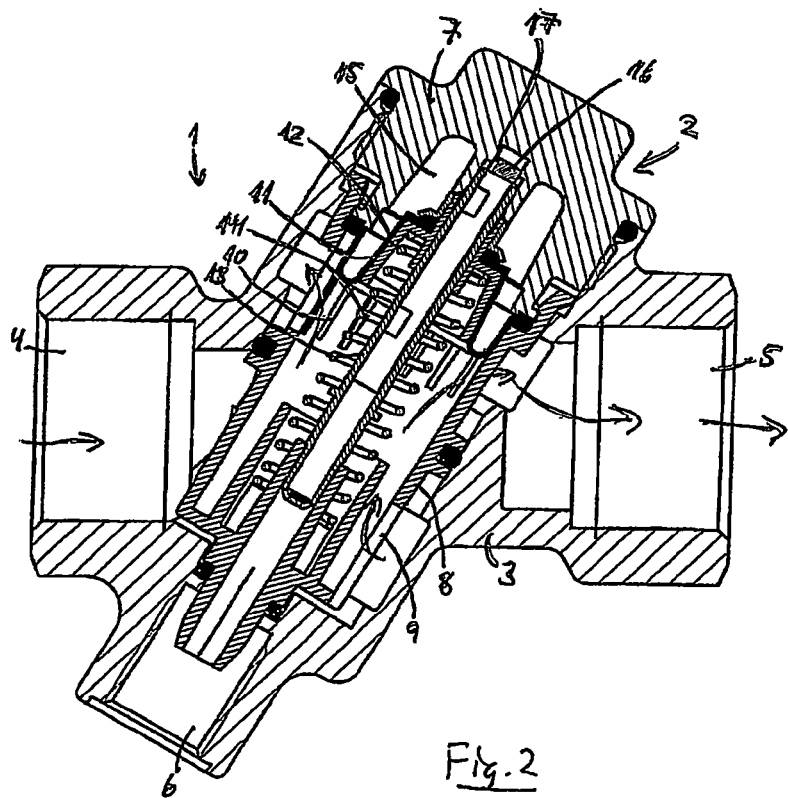
FIG. 2 shows a regulator valve with a regulator insert according to the invention.

FIG. 2 is a cross sectional view of a regulator valve 1 with a regulator insert 2 configured in accordance with the invention. The regulator valve 1 comprises a valve housing 3 which is typically cast from eg brass. The valve housing 3 comprises an inlet part 4 and an outlet part 5 that are aligned and can, via an internal thread (not shown), be interconnected with two pipes in the plant where the regulator valve 1 is used. Moreover, a coupling stud 6, whose function will be described later, is provided in the valve housing 3.

The regulator insert 2—or just the insert 2—is arranged in a slanting seat in the valve housing 3 and is mounted via cooperating threads between the valve housing 3 and a mounting sleeve 7 on the insert 2, as is commonly known. It is of no consequence that the insert 2 is arranged slopingly in the valve housing 3 as it may just as well be arranged differently.

The insert 2 also comprises a cup-shaped through-flow part 8 with inflow openings 9 and slot-shaped outflow openings 10 extending in the axial direction of the insert. The inflow openings 9 are in open communication with the inlet part 4 of the valve housing 3, while the outlet openings 10 are in open communication with the outlet part 5 of the valve housing 3.

At the outflow openings 10 a roller membrane 11 is provided that closes off the outflow openings 10 to a larger or smaller degree in response to the pressure conditions prevailing across and through the insert 2. At its outer peripheral edge, the roller membrane 11 is secured between the mounting bushing 7 and the cup-shaped part 8, while the inner peripheral edge is secured to a cap 12 arranged to be freely rotatable and axially displaceable on a central pipe 13. A helical spring 14 is arranged between the bottom of the cup-shaped part 8 and the cap 12.

Via the coupling stud 6, the central pipe 13 is in connection with another part of the plant in which the regulator valve 1 is used, as was described above with reference to FIG. 1. The other end of the central pipe 13 is in open communication with a space 15 above the roller membrane 11. The closing off of the outflow openings 9 is thus determined by the pressure conditions prevailing at any time across and through the insert and the pressure measured from the outside via the central pipe 13, as the cap 12 will adapt at a state of equilibrium between the pressure in the liquid on either side of the roller membrane 11 and the spring force from the spring 14.

Instead of being in capillary-tube connection with another part of the plant in which the regulator valve 1 is used, the central pipe can be in connection with the inlet part 4 of the valve housing 3, the coupling stud 6 being closed off by a plug and a bore being drilled between the inlet part 4 and a space behind the plug in the coupling stud 6.

In accordance with the invention the slot-shaped outflow openings 10 have different lengths, whereby the roller membrane 11 gradually closes them off, one of the outflow openings, however, being unable to be closed off completely by the roller membrane 11. Thus no instantaneous closure occurs, and the risk of large pressure variations occurring in the plant due to oscillating regulator valves 1 is minimised.

In order to further minimise the risk of oscillations, the central pipe 13 is throttled by an element 16 that exhibits only a very small opening 17. By making the opening 17 smaller than the smallest possible opening in the outflow openings 10 in the preferred embodiment, it is ensured that oscillations will not occur in the system.

The invention was described with reference to a preferred embodiment without the option of adjusting the size of the inflow openings 9. However, nothing precludes use of the invention in a regulator insert where it is possible to adjust the overall area of the inflow openings—either before the insert is mounted or from the outside following mounting in a plant, whereby the same regulator insert can be used in different pressure conditions.

The invention claimed is:

1. A regulator insert (2) for valves, in particular for controlling liquid flow in a plant for central heating or air-conditioning, which insert (2) comprises inflow openings (9) and a plurality of slot-shaped outflow openings (10) extending in the axial direction of the insert and being, via a roller membrane (11), closable in response to the difference in pressure across the insert (2) under the influence of a spring (14) that seeks to keep the outflow openings (10) open, characterised in that the slot-shaped outflow openings (10) have at least two different lengths, whereby complete closure of at least some of the outflow openings (10) can take place only consecutively; and that at least one of the slot-shaped outflow openings (10) has such length that complete closure thereof by means of the roller membrane (11) is not possible.

2. A regulator insert according to claim 1, characterised in that the insert (2) is provided with a central pipe (13) being in communication with a space (15) above the roller membrane (11), which central pipe (13) is throttled by an element (16) that exhibits only a very small opening (17).

3. A regulator insert according to claim 2, characterised in that the opening (17) is smaller than the smallest possible opening of the slot-shaped outflow openings (10).

* * * * *